March 3, 1964   C. Q. JACKSON ETAL   3,122,750
APPARATUS FOR ASSEMBLING PLYWOOD UNITS
Filed Dec. 4, 1961
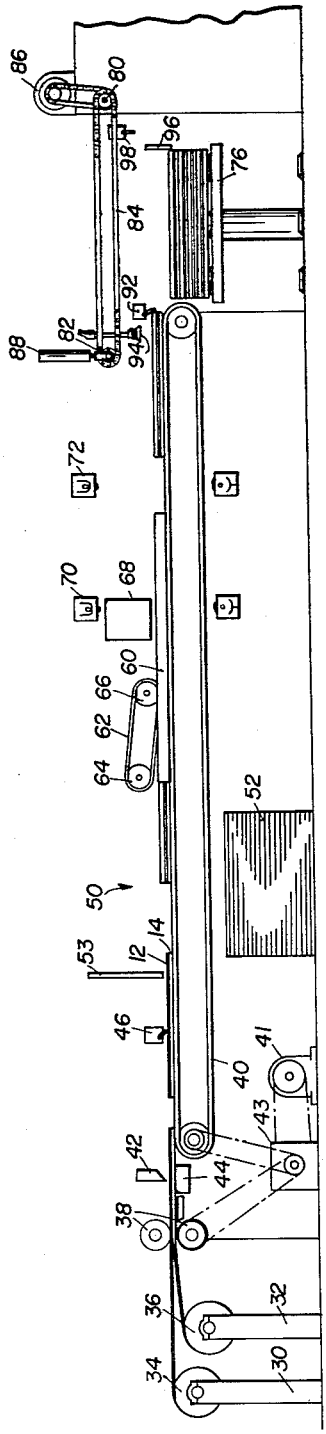
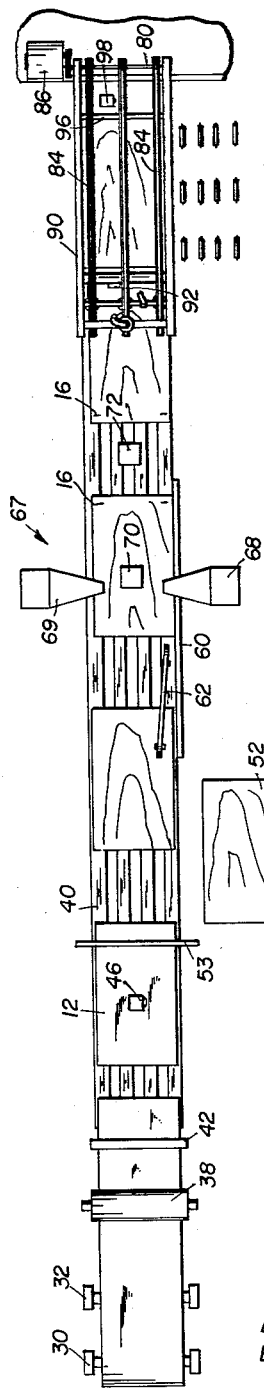
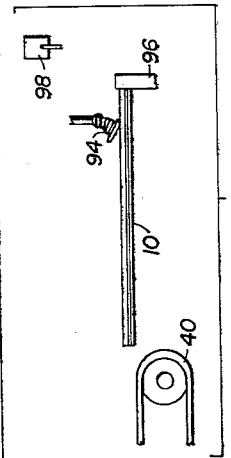
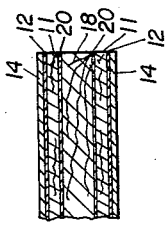
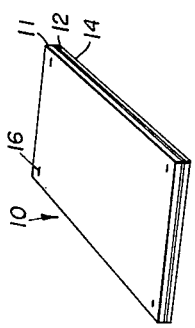
INVENTORS.
CHARLES Q. JACKSON
FREDERICK D. LARMORE
JOSEPH Y. EDINGER
BY
BUCKHORN, CHEATHAM & BLORE
ATTORNEYS

United States Patent Office 3,122,750
Patented Mar. 3, 1964

3,122,750
APPARATUS FOR ASSEMBLING PLYWOOD UNITS
Charles Q. Jackson, Frederick D. Larmore, and Joseph Y. Edinger, all of Aberdeen, Wash., assignors to Evans Harbor Products Co., Aberdeen, Wash., a corporation of Washington
Filed Dec. 4, 1961, Ser. No. 156,732
5 Claims. (Cl. 1—106)

The present invention relates to the manufacture of plywood and more particularly to apparatus for assembling units useful in the manufacture of plywood.

For the purpose of masking defects on the face veneers of plywood, and also to provide a smoother, more wear-resisting surface, a resin impregnated fibrous sheet is frequently secured to the exposed wood faces of plywood panels. For many purposes a plywood panel having a so-called medium density overlay, that is, a fibrous sheet such as a kraft paper impregnated with between about 20 to 40 percent of a phenol-formaldehyde resin, is desirable. Such impregnated pulp sheets are not self-adhering to the face veneer of the plywood and it is necessary to provide a glue line adhesive to effect bonding of the overlay sheet to the face veneer.

Heretofore, it has been the practice to provide such an adhesive preferably by coating the adhesive upon the surface of the overlay sheet which is to be united with the face of the veneer and generally by rolling the glue line adhesive upon the surface of the impregnated sheet. Many disadvantages are attendant to this procedure and it has been found that an improved product and other advantages are to be derived if a bonding sheet comprising a highly impregnated light weight pulp sheet is interposed between the face sheet and the veneer to which such face sheet is to be secured.

It is a particular object of the present invention to provide apparatus to facilitate the assembly of face units for the manufacture of plywood, such face units comprising a veneer, a resin impregnated overlay sheet, and a binding sheet therebetween.

More particularly, it is an object of the present invention to provide apparatus of the nature indicated that will facilitate and make more economical the manufacture of plywood having an overlay sheet thereon.

Still another object of the invention is to provide apparatus that will enable and facilitate the production of overlaid plywood having uniform high quality.

Other objects and advantages of the present invention will become more apparent hereinafter.

In accordance with the illustrated embodiment of the invention, apparatus is provided which will automatically feed continuous lengths of the resin impregnated material in superposed relation. Means are provided to sever sheets of desirable length for the manufacture of plywood from such lengths as they are fed onto a conveyor which transports them to a receiving station whereat the veneer may be placed thereon. The assembled veneer and sheets are then carried past stapling apparatus which automatically staples the veneers and the sheets together at the four corners to form a face unit which may subsequently be assembled with a core sheet and subjected to heat and presure to form a plywood panel. A unique stacking apparatus is provided to stack the face units after stapling for transfer to the plywood assembly operations in the plant.

For a more detailed description of the invention reference is made to the accompanying drawings from the following description thereof.

In the drawings:
FIG. 1 is a view of a face unit made with the apparatus of the invention;

FIG. 2 is an enlarged fragmentary sectional view through a plywood panel made utilizing face units manufactured on the apparatus of the invention;

FIG. 3 is a somewhat schematic side elevation of the apparatus of the invention;

FIG. 4 is a top plan view of such apparatus; and

FIG. 5 is an enlarged fragmentary view of a portion of the stacking mechanism utilized in the apparatus of the invention.

Referring first to FIGURE 1, the face units 10 which are fabricated in the apparatus of the invention comprise a wood veneer 11, a resin impregnated binding sheet 12 and a resin impregnated face sheet 14 which are stapled together at their four corners by a staple 16. The sheet 12 preferably is a relatively light weight kraft or sulphite pulp sheet having a basis weight of between about 5 to 8 pounds per 1000 square feet impregnated with about 65 percent or more of a phenol-formaldehyde type resin based on dry weight of resin solids and dry weight of impregnated paper. A suitable impregnated paper for this purpose is that sold by Reichold Chemicals, Inc. under the trademark Plyophen 2002–PGL. This product has a weight of about 15 pounds per 1000 square feet of impregnated paper, the resin content being about 65 percent resin solids based on the ratio of the weight of the dry resin solids to the weight of the dry impregnated paper.

The face sheet 14 preferably comprises a relatively heavy kraft or sulphite pulp type paper having a basis weight of between about 30 to 100 pounds per 1000 square feet with a basis weight of between 50 to 65 pounds preferred.

The impregnating resin for the face sheet may be of phenol-formaldehyde type resin such as, for example, of the type described in U.S. Patent No. 2,804,814. The preferred resin has a cresylic acid-formaldehyde partial condensation product prepared and described in U.S. Patent No. 2,150,698. The impregnated sheet preferably contains between about 20 to 40 percent of resin solids based on the ratio of the weight of the dry resin solids to the weight of the dry impregnated paper.

Referring to FIG. 2, the units 10 are utilized in the manufacture of plywood by placing the same upon opposite sides of a core sheet or sheets 18 with a suitable adhesive 20 dispersed between the core and the veneers 11. Such assemblies are subjected to heat and pressure to cure the adhesive 20 and resins in the sheets 12, 14. The adhesive 20 binds the veneers to the core 10, the cured resin of the sheet 12 binds the sheets 14 to the veneers 11 and the resin in the sheet 14 cures to a hard, infusible mass to form smooth, scuff resistant surfaces for the completed plywood panel.

Turning now to FIGURES 3 and 4, suitable roll stands 30, 32 are provided for supporting rolls 34, 36, respectively, of the binding sheet material and face sheet material. Means are provided for withdrawing a continuous length of the material from each of said rolls and feeding the same with the material 34 superposed for the roll 36, such means comprising a pair of nip rolls 38. From the nip rolls 38 the sheet material is fed onto an elongate, continuously moving horizontal conveyor 40. Any suitable means such as a motor 41 and variable speed drive unit 43 may be utilized to synchronize the speed of the rolls 38 and conveyor 40 and adjust the same for handling various material lengths. Means are provided for severing predetermined lengths of the sheet material as the same is fed onto the conveyor 40 comprising a reciprocating knife 42 and an anvil 44, the knife 42 being actuated through suitable means from a sensing device 46 which detects the advancing edge of the sheet material to cause the knife 42 to lower against the anvil and sever the sheets. Preferably, the conveyor 40 is driven at a faster rate of speed than the speed of the sheet material 34, 36 so that after severance the individual sheets 12, 14 will accelerate to the speed of the conveyor to provide separation between the pairs of sheets as shown in FIGURES 3 and 4.

After severance the sheets 12, 14 are advanced to a receiving station indicated generally at 50 at which a veneer 11 may be fed from a stack 52 thereof and placed upon each pair of sheets as they advance therepast. The veneer sheets 11 may be fed manually or suitable mechanical means (not shown) may be utilized to feed the veneer sheets into proper position. Immediately upstream from the receiving station 50 is a baffle 53 which extends across the conveyor to prevent the air, displaced as a veneer 11 is dropped upon the sheets 12, 14, from disturbing the position of the next advancing pair of such sheets.

Arranged along one edge of the conveyor 40 is a guide member 60 against which the units of veneer and pulp sheets are urged by means of a crowder comprising an endless belt 62 trained over a pair of suitably supported pulleys 64, 66. As shown in FIGURE 3, the pulley 64 at the upstream end of the crowder is positioned at a higher elevation than the pulley 66 so that the lower run of the belt 62 is inclined downwardly thus providing a relatively high entrance beneath the belt to facilitate entry of veneers and pulp sheets therebeneath. As indicated in FIGURE 4, the belt is also set obliquely with respect to the longitudinal direction of the conveyor 40, the belt converging toward the guide member 60 in the direction of movement of the material therebeneath. The belt 62 is driven by the frictional forces of the moving material therebeneath and tends to urge the units against the guide member 60.

Immediately beyond the crowder is a stapling station 67 comprising a pair of staplers 68, 69 positioned one adjacent each edge of the conveyor 40 and arranged upon actuation to drive a staple, such as shown at 16 in FIG. 1, through the veneer 11 and pulp sheets 12, 14 beneath the same. Any suitable commercially available stapler mechanism may be utilized for this purpose. The stapler 69 on the side opposite the guide 60 preferably is mounted for adjustment toward and away from the guide 60 so that assemblies of various widths may be handled. The staplers 68, 69 are actuated through a suitable control circuit (not shown) by means of a pair of detecting units which may comprise a pair of photoelectric devices 70, 72. The device 70 is arranged immediately adjacent the position of the staplers 68 to detect and signal the presence of the leading edge of the unit as it passes the staplers and to effect actuation of the staplers so as to drive the staples through the advancing edge of the unit. The detecting device 72 is positioned downstream of the staplers 68, 69 and is so positioned that it actuates the staplers 68, 69 so as to drive the staples through the trailing corners of the unit when triggered by the passage of the advancing edge of the face unit.

Adjacent the discharge end of the conveyor 40 is a stacking device to receive the stapled units 10 and stack them upon a pallet or other suitable receiving device for transfer to other portions of the plywood plant. Such stacking means comprises a platform 76 which preferably is elevatable so that it may be raised as stacking is commenced and lowered as the units are placed thereon to minimize the distance which units have to fall during their stacking procedure. Mounted over the platform 76 are a pair of shafts 80, 82 over which are trained a plurality of sprocket chains 84. A reversible motor 86 is provided for driving the chains 84. The shaft 80 is supported by suitable stationary journals, but the shaft 82 is suitably mounted so that it may be moved vertically by suitable means such as a piston and cylinder 88. In the embodiment shown the shaft 82 is journaled in a frame 90 which in turn is pivotally connected to the shaft 80.

Each of the chains 84 has secured thereto a vacuum cup 94 and which cups are adapted to be brought into engagement with the leading edge of each unit as it reaches the end of the conveyor 40 as shown in FIGURE 1. Any suitable source of vacuum may be provided and connected to the cups 94.

Arranged in the path of the units 10 as they emerge from the conveyor 40 is a control switch 92 which actuates the cylinder 88 to lower the cups 94 into contact with the units 10 and also actuates the motor 86 to advance the vacuum cups 94 in the direction of movement of the units 10 so that the cups support and hold the units substantially horizontally as they move into position over the platform 76. Arranged in line with the far end of the platform 76 is a stop member 96 which the unit 10 engages as shown in FIGURE 5 just as the unit clears the end of the conveyor 40. Upon engagement of the unit 10 with the stop 96, movement of the unit is arrested whereas the cups 94 will continue to be advanced by the chain causing the cups to tilt and break the vacuum so that the unit will be released to fall upon the platform 76. A limit switch 98 is provided to stop advancement of the cups 94 immediately after the unit 10 is released and effect reversing of the motor 86 and raising of the cylinder 88 to return the cups to position to engage the next advancing unit.

Having illustrated and described a preferred embodiment of the invention it should be apparent that the invention permits of modification in arrangement and detail. We claim all such modifications as come within the purview and scope of the appended claims.

We claim:

1. An apparatus for assembling and securing together face units for plywood comprising a wood veneer, a resin impregnated face sheet and an adhesive sheet disposed therebetween, said apparatus comprising:

an elongate, continuously moving conveyor having an entrance end and a discharging end, means at the entrance end of said conveyor for supporting a pair of supply rolls of material for said sheets, means for continuously withdrawing a continuous length of said material from each of said rolls and feeding the same onto said conveyor at said entrance end with the material for said adhesive sheet superposed the material for said face sheet, means for severing predetermined lengths of said material as the same is fed onto said conveyor so as to provide a pair of superposed said sheets, said conveyor having a receiving station at which a veneer may be placed upon each pair of said sheets as they are fed therepast, a baffle adjacent said receiving station on the upstream side thereof, extending across said conveyor to prevent air displaced as said veneer is placed from disturbing the position of the next advancing pair of said sheets, a guide member adjacent one edge of said conveyor and parallel thereto, a crowder comprising an endless belt mounted over said conveyor having a run adapted to engage a veneer as it passes therebeneath, said run being angularly inclined with respect to said guide member and converging toward said guide member in the direction of movement of said conveyor whereby said veneer is urged into engagement with said guide member to align the veneer therewith, a stapling station comprising, a pair of staplers positioned one adjacent each edge of said conveyor operable to place a staple through said veneer and sheets therebeneath, first means for detecting the advancing edge of said veneer, means responsive to said first detecting means to initiate operation of said staplers to place staples through said veneer and sheets adjacent the advancing corners thereof, second means for detecting the advancing edge of said veneer, means responsive to said second detecting means to initiate operation of said staplers to place staples through said veneer and sheets adjacent the trailing corners thereof, and stacking means adjacent the discharge end of said conveyor to receive and stack the stapled units.

2. An apparatus for assembling and securing together face units for plywood comprising a wood veneer, a resin impregnated face sheet and an adhesive sheet disposed therebetween, said apparatus comprising:

an elongate, continuously moving conveyor having an entrance end and a discharge end, means at the entrance end of said conveyor for supporting a pair of supply rolls of material for said sheets, means for continuously withdrawing a continuous length of said material from each of said rolls and feeding the same onto said conveyor at said entrance end with the material for said adhesive sheet superposed the material for said face sheet, means for severing predetermined lengths of said material as the same is fed onto said conveyor so as to provide a pair of superposed said sheets, said conveyor having a receiving station at which a veneer may be placed upon each pair of said sheets as they are fed therepast, a stapling station comprising, a pair of staplers positioned one adjacent each edge of said conveyor operable to place a staple through said veneer and sheets therebeneath, first means for detecting the advancing edge of said veneer, means responsive to said first detecting means to initiate operation of said staplers to place staples through said veneer and sheets adjacent the advancing corners thereof, second means for detecting the advancing edge of said veneer, means responsive to said second detecting means to initiate operation of said staplers to place staples through said veneer and sheets adjacent the trailing corners thereof, and stacking means adjacent the discharge end of said conveyor to receive and stack the stapled units.

3. In an apparatus for assembling face units for plywood, means for forming separate pileups of binding sheet and an elongated facing sheet, a veneer-applying station where veneer is dropped upon said pileups, a stapling station spaced from the veneer-applying station, means for advancing such separate pileups sequentially past the veneer-applying station and the stapling station, a baffle positioned between the veneer-applying station and said means for forming separate pileups for keeping air currents caused by dropping of the veneer at the veneer-applying station from disturbing said units of the pileups and veneer placed thereon as the units are advanced toward the veneer-applying station, and means for advancing the units to the stapling station.

4. An apparatus for assembling and securing together face units for plywood comprising a wood veneer, a resin impregnated face sheet and an adhesive sheet disposed therebetween, said apparatus comprising:

an elongate, continuously moving conveyor having an entrance end and a discharge end, means at the entrance end of said conveyor for supporting a pair of supply rolls of material for said sheets, means for continuously withdrawing a continuous length of said material from each of said rolls and feeding the same onto said conveyor at said entrance end with the material for said adhesive sheet superposed the material for said face sheet, means for severing predetermined lengths of said material as the same is fed onto said conveyor so as to provide a pair of superposed said sheets, said conveyor having a receiving station at which a veneer may be placed upon each pair of said sheets as they are fed therepast, a staping station comprising a pair of staplers positioned one adjacent each edge of said conveyor operable to place a staple through said veneer and sheets therebeneath, first means for detecting the advancing edge of said veneer, means responsive to said first detecting means to initiate operation of said staplers to place staples through said veneer and sheets adjacent the advancing corners thereof, second means for detecting the advancing edge of said veneer, and means responsive to said second detecting means to initiate operation of said staplers to place staples through said veneer and sheets adjacent the trailing corners thereof.

5. An apparatus for assembling and securing together face units for plywood comprising a wood veneer, a resin impregnated face sheet and an adhesive sheet disposed therebetween, said apparatus comprising:

an elongate, continuously moving conveyor having an entrance end and a discharge end, means at the entrance end of said conveyor for supporting a pair of supply rolls of material for said sheets, means for continuously withdrawing a continuous length of said material from each of said rolls and feeding the same onto said conveyor at said entrance end with the material for said adhesive sheet superposed the material for said face sheet, means for severing predetermined lengths of said material as the same is fed onto said conveyor so as to provide a pair of superposed said sheets, said conveyor having a receiving station at which a veneer may be placed upon each pair of said sheets as they are fed therepast, a baffle adjacent said receiving station on the upstream side thereof, extending across said conveyor to prevent air displaced as said veneer is placed from disturbing the position of the next advancing pair of said sheets, a guide member adjacent one edge of said conveyor and parallel thereto, a crowder comprising an endless belt mounted over said conveyor having a run adapted to engage a veneer as it passes therebeneath, said run being angularly inclined with respect to said guide member and converging toward said guide member in the direction of movement of said conveyor whereby said veneer is urged into engagement with said guide member to align the veneer therewith, a stapling station comprising a pair of staplers positioned one adjacent each edge of said conveyor operable to place a staple through said veneer and sheets therebeneath, first means for detecting the advancing edge of said veneer, means responsive to said first detecting means to initiate operation of said staplers to place staples through said veneer and sheets adjacent the advancing corners thereof, second means for detecting the advancing edge of said veneer, and means responsive to said second detecting means to initiate operation of said staplers to place staples through said veneer and sheets adjacent the trailing corners thereof.

References Cited in the file of this patent

UNITED STATES PATENTS

| | | |
|---|---|---|
| 1,634,196 | Jones | June 28, 1927 |
| 1,874,670 | Walker | Aug. 30, 1932 |
| 2,255,745 | Anderson | Sept. 16, 1941 |
| 2,291,650 | Robinson | Aug. 4, 1942 |
| 2,379,682 | Colucci | July 3, 1945 |
| 2,637,098 | Stein | May 5, 1953 |
| 2,722,684 | Schmied | Nov. 8, 1955 |
| 2,973,960 | Guccicone | Mar. 7, 1961 |